(12) United States Patent
Hasegawa

(10) Patent No.: US 8,274,661 B2
(45) Date of Patent: Sep. 25, 2012

(54) SHAPE CALCULATION METHOD

(75) Inventor: Saori Hasegawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 255 days.

(21) Appl. No.: 12/630,563

(22) Filed: Dec. 3, 2009

(65) Prior Publication Data
US 2010/0141958 A1    Jun. 10, 2010

(30) Foreign Application Priority Data
Dec. 5, 2008    (JP) .................. 2008-311231

(51) Int. Cl.
*G01B 11/02*    (2006.01)
(52) U.S. Cl. ....................................... 356/511
(58) Field of Classification Search ........... 356/511–512
See application file for complete search history.

(56) References Cited

U.S. PATENT DOCUMENTS
4,139,304  A  *  2/1979  Redman et al. ............... 356/511
6,956,657  B2    10/2005  Golini et al.

FOREIGN PATENT DOCUMENTS
JP    H02-259509 A    10/1990
JP    2004-125768 A    4/2004
JP    2006-317199 A    11/2006

* cited by examiner

*Primary Examiner* — Tarifur Chowdhury
*Assistant Examiner* — Jonathon Cook
(74) *Attorney, Agent, or Firm* — Canon U.S.A., Inc. IP Division

(57) ABSTRACT

A method for calculating a shape includes dividing an aspherical test surface into a plurality of measurement regions configured to overlap with one another, receiving, at a light receiving unit, interference fringes which occur due to interference light generated by light reflected on a reference surface serving as a reference for calculating a shape of the test surface and light reflected by each of the measurement regions, and calculating surface shapes of the measurement regions, and calculating a shape of the test surface by joining the calculated surface shapes, wherein the calculation of surface shapes includes adjusting relative positions of the test surface and the reference surface and adjusting a position of the light receiving unit so that the test surface and the light receiving unit have a conjugate relationship with each other in a state in which the position of the test surface is adjusted.

9 Claims, 12 Drawing Sheets

SHAPE CALCULATION METHOD

BACKGROUND OF THE INVENTION

1. Field of the Invention

The present invention relates to a shape calculation method for calculating a shape of a test object which has an aspheric surface with high accuracy.

2. Description of the Related Art

Japanese Patent Application Laid-Open Nos. 02-259509 and 2004-125768 discuss a method referred to as a "wave field synthesis method" or a "stitching method" as a technique for measuring a shape of a surface of an optical element. The stitching method is described hereinafter with reference to FIGS. 11 and 12.

FIG. 11 illustrates a test surface 4a of an optical element that is a test object, which is seen from above. An abscissa axis is set as an x-axis, while an ordinate axis is set as a y-axis. A test surface is divided into a plurality of measurement regions (sub-apertures), each of which is represented by a small circle and overlaps with other measurement regions. A measurement region wps1 includes a center of the test surface 4a represented as a shaded area. Another measurement region wps2 is represented by a dashed circle and adjoins most closely in a negative y-direction to the measurement region wps1. According to the stitching method, a test surface is divided into a plurality of measurement regions. Then, all measurement data are combined with one another. Thus, the shape of the entire test surface is obtained. The measurement of each measurement region is performed at a position where interference fringes are null fringes. The word "null" indicates a state in which a density of interference fringes is low. More specifically, according to the present invention, the word "null" indicates a state in which a number of interference fringes is 1 or less.

Next, a typical configuration of an apparatus for performing a stitching method is described hereinafter with reference to FIG. 12. An apparatus for measuring a shape of a test surface 14a of a test object 14 includes a light source 11, a half mirror 12, a tilt/shift (TS) lens 13, a reference surface 13a, a holder 15 for holding the test object 14, a stage 16 for driving the test object 14 together with the holder 15, an imaging lens 17, and an image-pickup unit 18. In FIG. 12, a z-axis extends in a lateral direction in a plane of paper, on which FIG. 12 is drawn, in parallel with an optical axis of the TS lens, an x-axis extends in a direction perpendicular to the plane of paper, and a y-axis extends in an up-down direction in the plane of paper. The stage 16 is constituted of a five-axis coordinate system including an x-axis, a y-axis, a z-axis, a θx-axis, and a θz-axis, or a six-axis coordinate system including a θy-axis in addition to the five axes. The θx-axis turns around the x-axis. The θy-axis turns around the y-axis. The θz-axis turns around the z-axis. A shape of the test surface 14a is a sphere.

A light flux which is emitted from the light source 11 is transmitted through the half mirror 12 and incident on the TS lens 13. Thus, a spherical wave is generated. The reference surface 13a serves to generate test light by transmitting a part of the light flux and to generate reference light by reflecting a part of the light flux. The test light transmitted through the reference surface 13a is reflected by the test surface 14a and interferes with the reference light reflected by the reference surface 13a. The interfering light is transmitted again through the TS lens 13 and reflected by the half mirror 12. Then, the reflected light is condensed by the imaging lens 17 to the image-pickup unit 18. Thus, the interfering light is imaged as interference fringes.

In FIG. 12, a first measurement position wp1 is a position of the test surface at which the interference fringes are null fringes when data is measured in the measurement region wps1 which includes a central portion of the test surface 14a illustrated in FIG. 11. When the test object 14 is placed at the first measurement position wp1, the image-pickup unit 18 is placed at a first position cp1 on which the image-pickup unit 18 is conjugate with the test surface 14a. A distance (cavity length) between the reference surface 13a and the test surface 14a at that time is designated by "L1".

A second measurement position wp2 is another position of the test surface, at which the interference fringes are null fringes when data is measured in the measurement region wps2 illustrated in FIG. 11. When the test object 14 is placed at the second measurement position wp2, the image-pickup unit 18 is placed at a second position cp2 on which the image-pickup unit 18 is conjugate with the test surface 14a. The distance (cavity length) between the reference surface 13a and the test surface 14a at that time is designated by "L2".

When the test surface is a spherical surface, the cavity length is such that L1=L2. Thus, the position of the image-pickup unit 18 is set so that cp1=cp2. It is unnecessary to adjust the positions of the test surface 14a and the image-pickup unit 18. At all sub-apertures that are not limited to the measurement regions wps1 and wps2 in FIG. 11, the cavity length is equal to L1. Thus, the position of the image-pickup unit 18 is equal to cp1. Consequently, data can be measured in all measurement regions while the position of the image-pickup unit 18 is fixed.

After the shape of each measurement region is calculated by correcting errors at each measurement region, the shapes of all of the measurement regions are joined together. The errors at each measurement region are, e.g., an attitude error, a positioning error, and an abscissa distortion of the test surface and a shape error of the reference surface. An amount of each error is calculated by utilizing an overlapping area of each sub-aperture. Alternatively, the amount of each error is preliminarily and separately measured or calculated and the preliminarily measured or calculated amount of each error is used.

However, if the test surface has an aspheric surface, the interference fringes are not null fringes even when the test surface is illuminated with spherical wave light. Thus, generally, measurement is performed at a position where the number of interference fringes is minimized. In this case, the cavity length varies with the measurement regions. Accordingly, it is necessary to adjust focusing relationship between the test surface and the image-pickup unit. When the focusing relationship between the test surface and the image-pickup unit is adjusted, the focusing relationship between the image-pickup unit and the reference surface changes. Thus, the shape of the reference surface viewed from each measurement region varies. Consequently, more particularly, a high-frequency error occurs in the shape of the reference surface which is calculated using data obtained from a plurality of measurement regions that differ from one another in the focusing relationship. Accordingly, a high-frequency error occurs in the shape of the test surface which is obtained by a difference between data measured by the image-pickup unit and the calculated shape of the reference surface.

SUMMARY OF THE INVENTION

The present invention is directed to a shape calculation method capable of reducing a high-frequency error in a shape of a test surface and calculating the shape thereof with higher accuracy.

According to an aspect of the present invention, a method for calculating a shape includes dividing an aspherical test surface into a plurality of measurement regions configured to overlap with one another, receiving, at a light receiving unit, interference fringes which occur due to interference light generated by light reflected on a reference surface serving as a reference for calculating a shape of the test surface and light reflected by each of the measurement regions, and calculating surface shapes of the measurement regions, and calculating a shape of the test surface by joining the calculated surface shapes of the measurement regions, wherein the calculation of surface shapes of the measurement regions includes adjusting relative positions of the test surface and the reference surface and adjusting a position of the light receiving unit so that the test surface and the light receiving unit have a conjugate relationship with each other in a state in which the position of the test surface is adjusted.

According to the shape calculation method of the present invention, a high-frequency error in a shape of a test surface can be reduced and the shape of the test surface can be calculated with higher accuracy.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

According to a shape calculation method of the present invention, first, an aspherical test surface is divided into a plurality of measurement regions (sub-apertures) so that each of the measurement regions has one or more overlapping areas that overlap with one or more other measurement regions. A light receiving unit receives interference fringes which occur due to interference light generated by light reflected by a reference surface serving as a reference, and light reflected by each measurement region. Then, a surface shape of each measurement region is calculated based on the received interference fringes. Next, a shape of the test surface is calculated by joining the calculated surface shapes of the measurement regions.

When the shape of the aspherical test surface is measured by illuminating the test surface with spherical waves, the measured shape thereof is susceptible to influence of optical aberration and environmentally caused errors. Thus, it is desirable for minimizing the influence of the errors to perform measurement of the surface shape of each measurement region by adjusting a position of the test surface so as to minimize a number of interference fringes to acquire a phase distribution. The position at which the number of interference fringes is minimized is in a state where a position of a center of curvature of a local spherical surface coincides with that of a center of curvature of a spherical wave. The local spherical surface is a surface which is obtained by approximating an aspherical surface to a closest spherical surface in a radial direction of one point on the aspherical surface.

Figure 1:
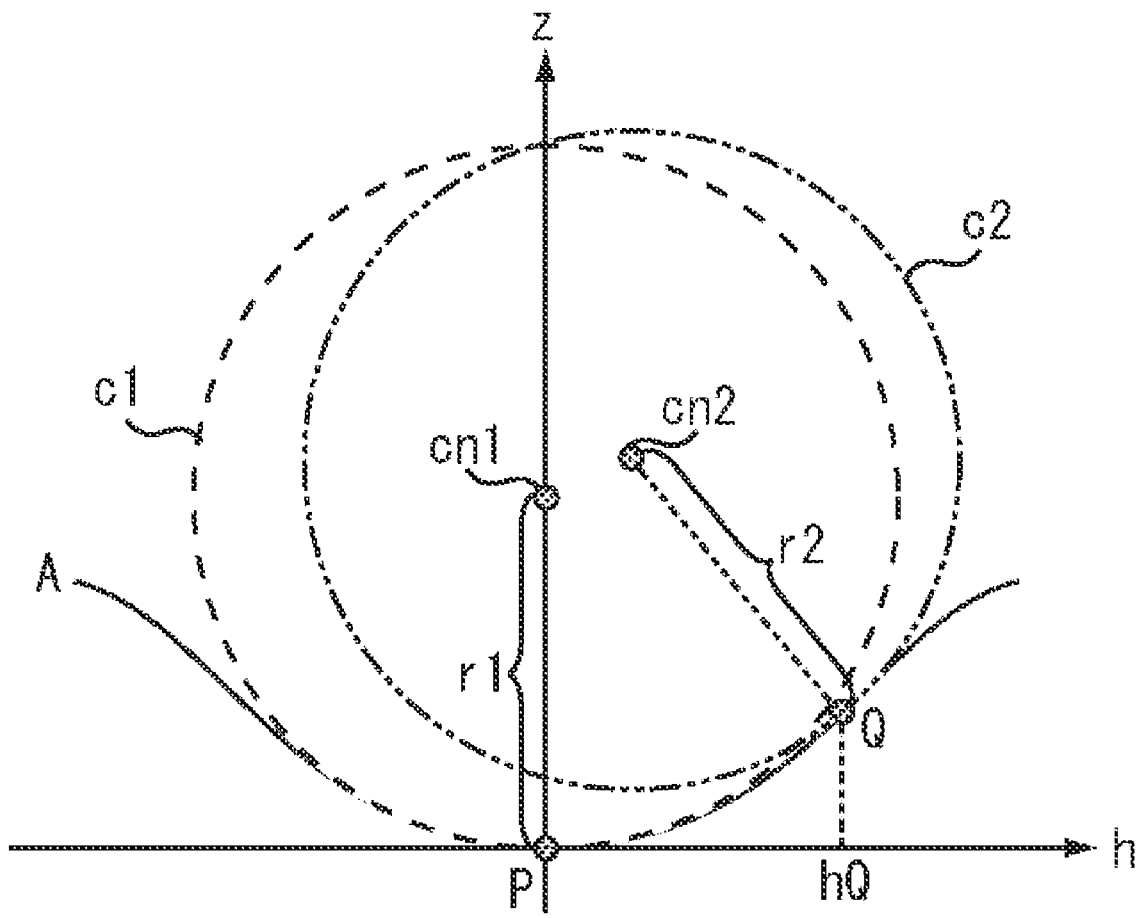
FIG. 1 schematically illustrates an aspheric surface.

The local spherical surface is described with reference to FIG. 1 illustrating a cross-section of an aspherical surface. In FIG. 1, an abscissa axis h extends in the radial direction of the aspherical surface. An ordinate axis Z extends in the direction of height. The shape of the aspherical surface A can be represented by the following function of h and Z. Z=z(h). Points P and Q on the aspherical surface A respectively have values of height Z when h=0 and h=hQ of the abscissa axis h. In FIG. 1, local aspheric surfaces c1 and c2 correspond to the points P and Q and have centers of curvature cn1 and cn2, and radii r1 and r2 of curvature, respectively. A radius re of each of a local spherical surface can be expressed by the following expression (1).

$$re = (1+(dz(h)/dh)^2)^{3/2}/(d^2z(h)/dh^2) \qquad (1)$$

The local spherical surface c1 corresponding to the point P differs from that c2 corresponding to the point Q. Thus, the cavity length corresponding to measurement at the point Q changes from that corresponding to measurement at the point P by (r1-r2). When the focusing relationship between the test surface and the light receiving unit is adjusted according to the cavity length, the focusing relationship between the reference surface serving as a reference for calculating the shape of the test surface and the light receiving unit varies every measurement region. More specifically, a high-frequency error occurs in the shape of the reference surface which is obtained using data of a plurality of measurement regions differing from one another in the focus position.

Thus, according to the present invention, the error in the shape of the reference surface can be corrected and the high-frequency error can be reduced by performing the following four steps of calculating the shape of a surface of each measurement region. In a first step, the position of the test surface is adjusted so as to minimize the number of interference fringes. In a second step, in a state in which the position of the test surface is adjusted, the position of the light receiving unit is adjusted so that the test surface is conjugate with the light receiving unit. In a third step, a phase distribution of interference fringes is measured in a state in which the position of the light receiving unit is adjusted. In a fourth step, the surface shape of each measurement region is calculated using the measured phase distribution of the interference fringes. By performing processing in the third and fourth steps, even when the focusing relationship between the reference surface and the light receiving unit varies by the measurement region, the error of the shape of the reference surface which corresponds to each measurement region can be canceled. So that the shape of the test surface in the measurement regions can be calculated with good accuracy. Further, the shape of the entire test surface in the measurement regions can be calculated with good accuracy by joining the shape of each measurement region.

An exemplary embodiment of the present invention is described below with reference to the accompanying drawings.

Figure 2:
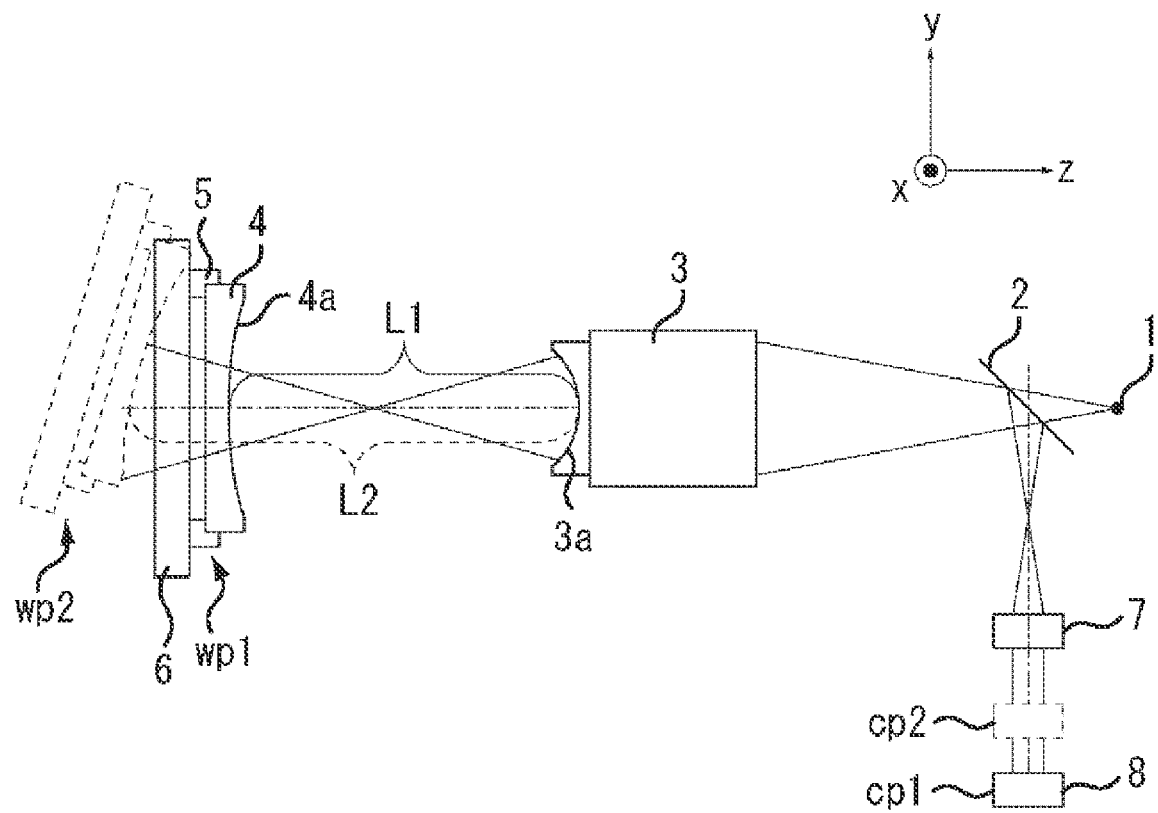
FIG. 2 schematically illustrates a measurement apparatus according to the present invention.

FIG. 2 schematically illustrates a measurement apparatus for measuring an aspherical surface shape according to the exemplary embodiment of the present invention. An measurement apparatus for measuring a shape of a test surface $4a$ of a test object 4 includes a light source 1, a half mirror 2, a TS lens 13, a reference surface $3a$, a holder 5 for holding the test object 4, a stage 6 for driving the test object 4 together with the holder 5, an imaging lens 7, and an image-pickup unit (light receiving unit) 8. In FIG. 2, a z-axis extends in a lateral direction in a plane of paper, on which FIG. 2 is drawn, in parallel with an optical axis of the TS lens, an x-axis extends in a direction perpendicular to the plane of paper, and a y-axis extends in an up-down direction in the plane of paper. The stage 6 is constituted of a five-axis coordinate system including an x-axis, a y-axis, a z-axis, a θx-axis, and a θz-axis, or a six-axis coordinate system including a θy-axis in addition to the five axes. The θx-axis turns around the x-axis. The θy-axis turns around the y-axis. The θz-axis turns around the z-axis.

A light flux which is emitted from the light source 1 is transmitted through the half mirror 2 and incident on the TS lens 3. Thus, a spherical wave is generated. The reference surface $3a$ serves to generate test light by transmitting a part of the light flux and to generate reference light by reflecting a part of the light flux. The test light transmitted through the reference surface $3a$ is reflected by the test surface $4a$ and interferes with the reference light reflected by the reference surface $3a$. The interfering light is transmitted again through the TS lens 3 and reflected by the half mirror 2. Then, the reflected light is condensed by the imaging lens 7 to the image-pickup unit 8. Thus, the interfering light is imaged as interference fringes.

In FIG. 2, a first measurement position wp1 is a position of the test surface at which the number of interference fringes is minimized, when measurement is performed on a measurement region which includes a central portion of the test surface $4a$. When the test object 4 is placed at the first measurement position wp1, the image-pickup unit 8 is placed at a first position cp1 on which the image-pickup unit 8 is conjugate with the test surface $4a$. The distance (cavity length) between the reference surface $3a$ and the test surface $4a$ at that time is designated by "L1".

A second measurement position wp2 is set as another position of the test object 4 at which the number of interference fringes is minimized in the measurement region when the measurement is performed in the measurement region adjoining the measurement region on which the measurement is performed at the first measurement position wp1. When the test object 4 is placed at the second measurement position wp2, the image-pickup unit 8 is placed at a second position cp2 on which the image-pickup unit 8 is conjugate with the test surface $4a$. The distance (cavity length) between the reference surface $3a$ and the test surface $4a$ at that time is designated by "L2".

Figure 3:
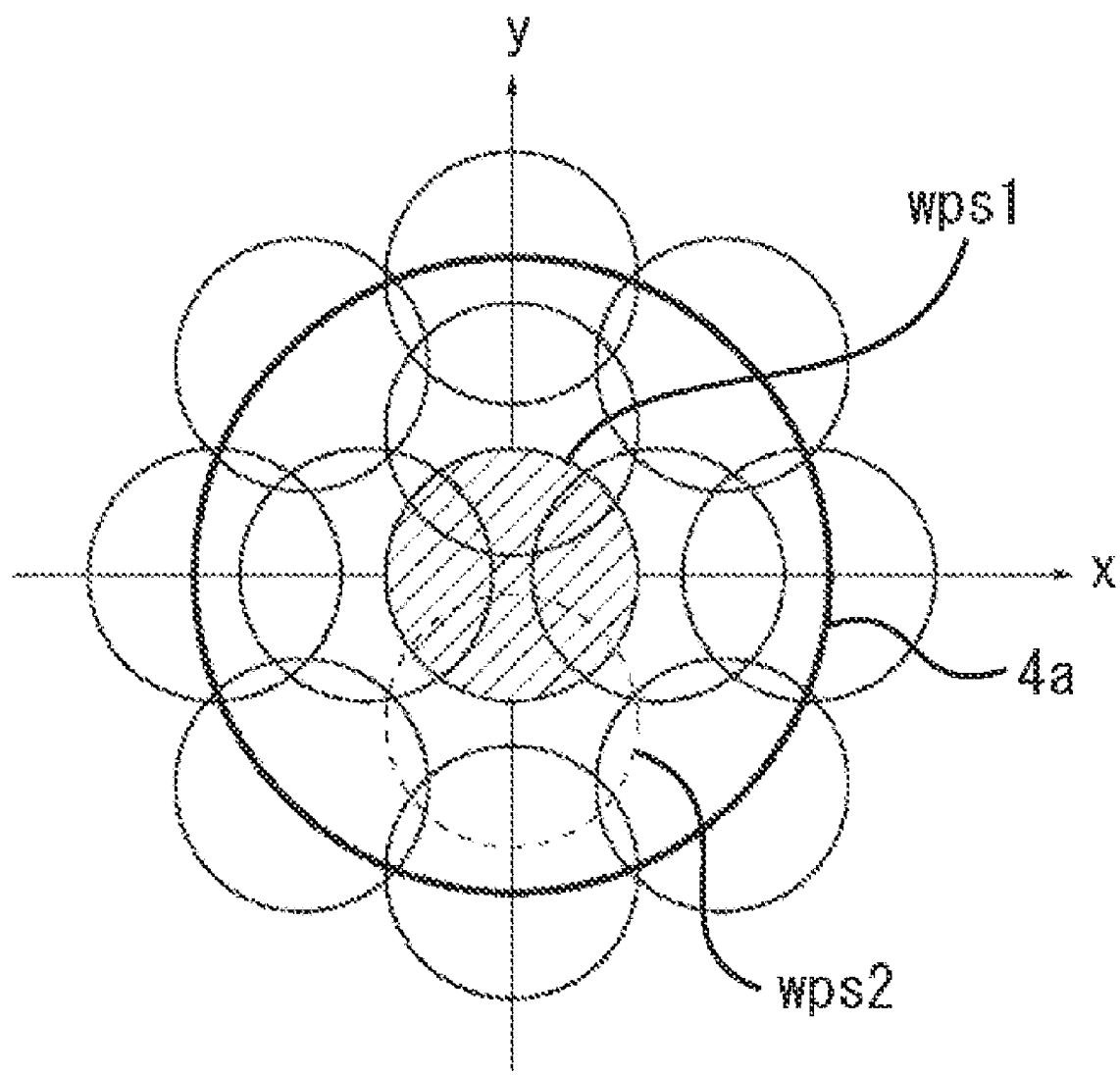
FIG. 3 schematically illustrates a plurality of measurement regions into which a test surface is divided.

Next, FIG. 3 schematically illustrates a plurality of measurement regions into which the test surface is divided. According to the present exemplary embodiment, in which a numerical aperture (NA) of the test surface $4a$ is larger than that of the reference surface $3a$, is described hereinafter by way of example. It is assumed that each of the plurality of measurement regions has one or more overlapping areas which overlap with one or more other measurement regions to perform measurement on all of the regions of the test surface $4a$. Also, it is assumed that when the test object 4 is placed at the first measurement position wp1, the measurement is performed on a measurement region wps1, and that when the test object 4 is placed at the second measurement position wp2, the measurement is performed on a measurement region wps2.

The measurement of the interference fringes is performed on all of the measurement regions including the first measurement region wps1 and the second measurement region wps2. After the surface shapes of all of the measurement regions are calculated, the shape of the entire test surface can be calculated by joining the shapes of each measurement regions.

Figure 4:
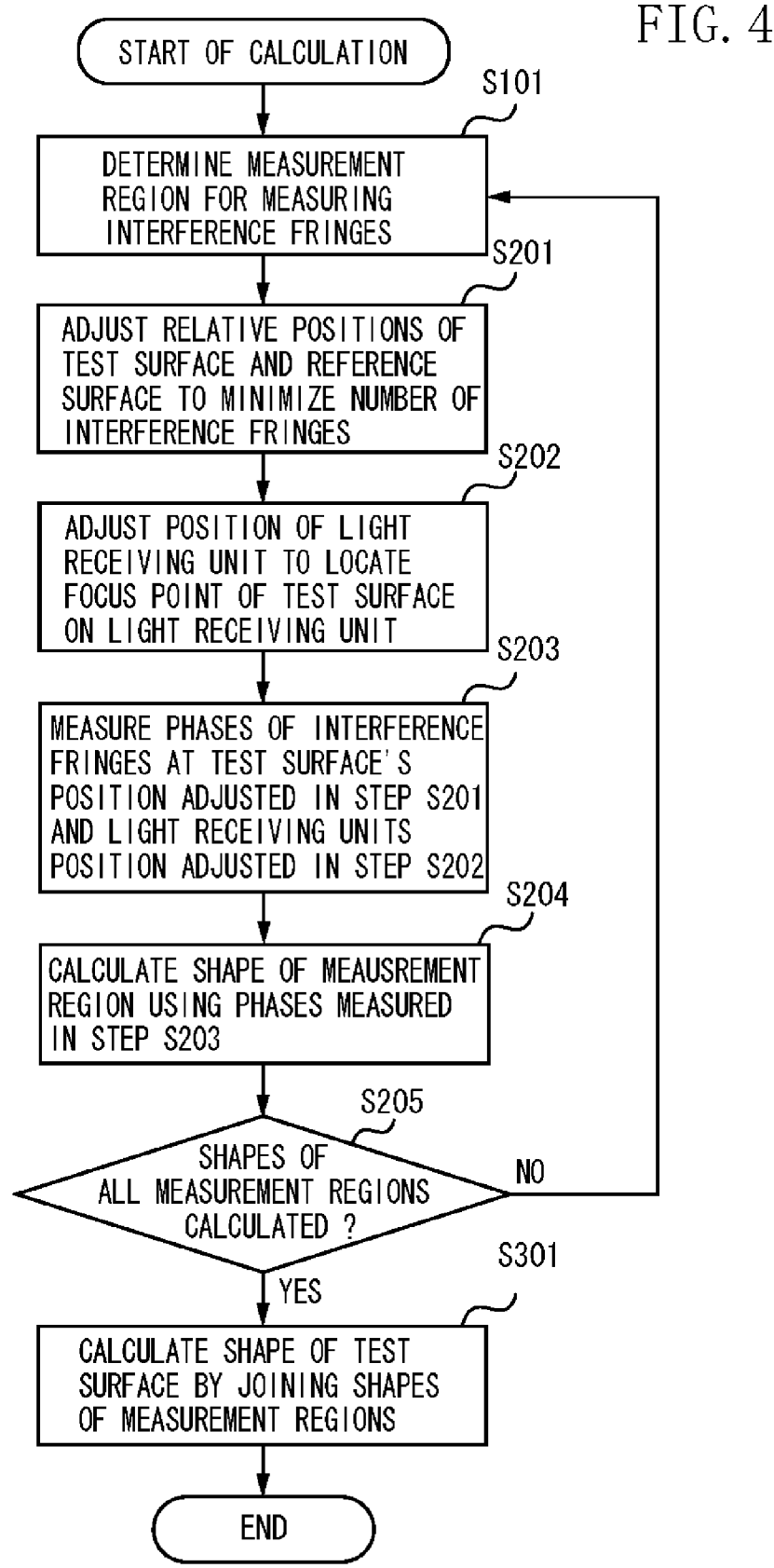
FIG. 4 is a flow chart illustrating steps for performing a shape calculation method according to the present invention.

Next, each step of a shape calculation method according to the present invention is described below with reference to FIG. 4.

First, in step S101, measurement regions for measuring interference fringes are determined. Any method of determining the measurement regions for measuring interference fringes from a plurality of measurement regions can be employed in the apparatus according to the present invention.

Interference fringes are measured in each of the measurement regions determined in step S101. Thus, the surface shape of each of the measurement regions is calculated. The calculation of the surface shape of each measurement region is performed in the following four steps S201 through S204. Thus, the shape of the test surface $4a$ in each of the measurement regions is calculated.

In the first step S201, the relative positions of the test surface $4a$ and the reference surface $3a$ are adjusted to minimize the number of interference fringes measured by the image-pickup unit 8. The test object 4 may be actually moved to adjust the relative positions. Alternatively, the light source 1, the half mirror 2, the TS lens 3, the imaging lens 7, and the image-pickup unit 8 can actually be moved. Further alternatively, both of the test object 4 and the reference surface $3a$ can actually be moved. When the light source 1, the half mirror 2, the TS lens 3, the imaging lens 7, and the image-pickup unit 8 are moved, the positional relationship among the light source 1, the half mirror 2, the TS lens 3, the imaging lens 7, and the image-pickup unit 8 is maintained.

In the second step S202, the position of the image-pickup unit 8 is adjusted so that a focal point of each of the measurement regions is located on a light receiving surface of the image-pickup unit 8 at the position of the test surface $4a$ in the first step S201. In other words, the image-pickup unit 8 is placed at a position on which the image-pickup unit 8 is conjugate with each measurement region.

In the third step S203, the phase distribution of interference fringes is measured at a position where the test surface $4a$ is placed at the focus position adjusted in the second step S202.

In the fourth step S204, the shape of each measurement region is calculated using the phase distribution of the interference fringes measured in the third step S203.

In step S205, upon completion of processing in fourth step S204, if there are any measurement region on which the measurement is not performed (NO in step S205), processing in the four steps S201 through S204 is repeated on such measurement regions. On the other hand, if there is no measurement region on which the measurement is not performed (YES in step S205), then in step S301, the shape of the entire test surface is calculated by joining the calculated shapes of the measurement regions.

The four steps S201 through S204 are described in detail below by describing, by way of example, the measurement of interference fringes in the sub-aperture wps1 illustrated in FIG. 3 which is performed when the test object 4 is placed at the first position wp1 illustrated in FIG. 2.

In the first step S201, alignment is performed by moving the test object 4 using the stage 6 to minimize a piston, a tilt, and a power of the test surface 4a. More specifically, the test object 4 is moved to the position wp1 where the number of interference fringes in the measurement region wps1 is minimized. At that time, even when the test surface 4a is not accurately focused on the light receiving surface of the image-pickup unit 8, it is sufficient to focus on the test surface 4a to the extent that the number of interference fringes can be measured.

Next, in the second step S202, the focal point of the test surface 4a is adjusted on the light receiving surface of the image-pickup unit 8 by adjusting the position of the image-pickup unit 8 to the position cp1 on which the test surface 4a is conjugate with position of the image-pickup unit 8 at the position wp1 of the test object 4 in the first step S201. Subsequently, the focus position is set at the position of the image-pickup unit 8.

Various methods can be considered to focus the test surface on the light receiving surface of the image-pickup unit. However, desirable focusing methods according to some embodiments of the present invention are described below.

(1) Method Using Modulation

Because the test surface 4a is an aspherical surface, spatial light/dark intensity distributions occur in interference fringes in a sub-aperture. Temporal intensity distributions of the interference fringes are acquired by moving the focus position back and forth. Then, the modulation Mod defined by the following expression is calculated from the intensity distributions of the interference fringes.

$$Mod=(Imax-Imin)/(Imax+Imin)$$

where Imax designates a maximum value of the intensity of the interference fringes, and Imin designates a minimum value of the intensity thereof.

Figure 5:
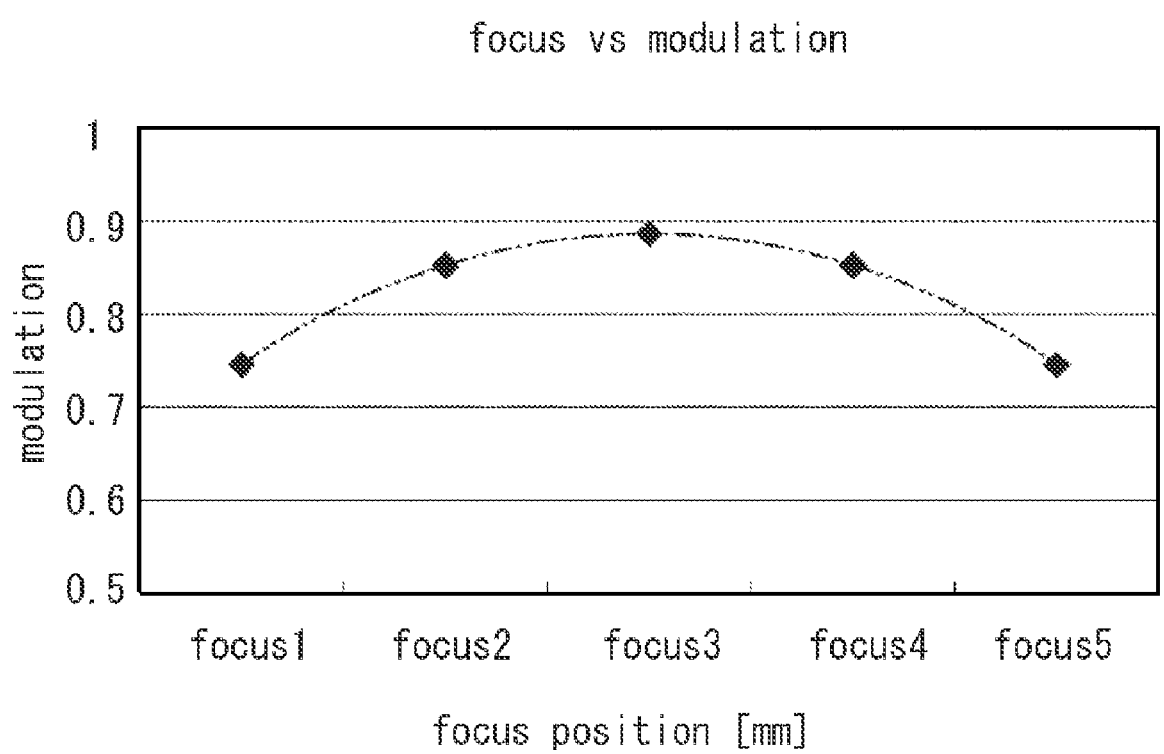
FIG. 5 illustrates a relationship between each focus position and a modulation.

The modulation Mod is obtained at all points on a measurement surface. Therefore, a value obtained by averaging the modulation Mod at all points can be used. FIG. 5 illustrates a relationship between the focus position and the modulation Mod. In FIG. 5, an abscissa axis represents the focus position, while an ordinate axis represents the modulation. The modulation is maximized at a position where the test surface is focused. Accordingly, the image-pickup unit 8 is adjusted to the focus position at which the modulation is maximized. In a case illustrated in FIG. 5, the modulation is maximized at a focus position "focus3".

If no interference fringes occur when the test surface 4a is at the first position wp1, the test surface 4a may be tilted so that interference fringes occur. Thus, similarly, the focus position can be determined by calculating the modulation.

(2) Method Utilizing Amplitude of Frequency Component

Figure 6:
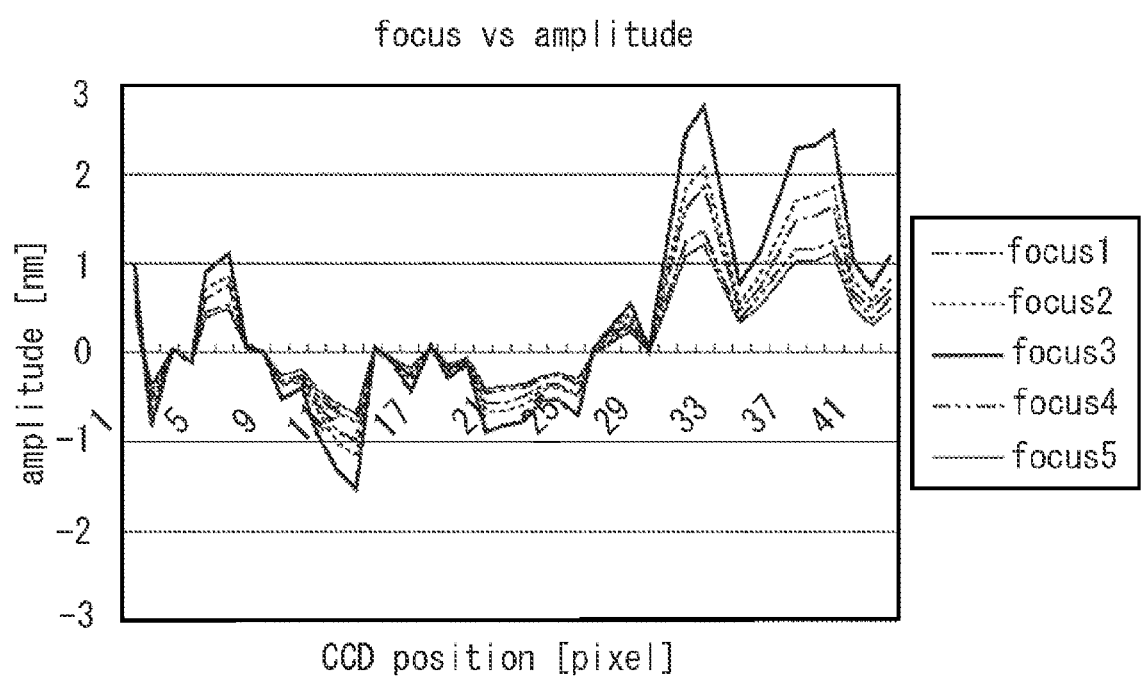
FIG. 6 illustrates relationships between each focus position and a high-frequency component of the phase distribution.

This method uses a property that when the focal point of the test surface 4a is deviated from a light receiving surface of the image-pickup unit 8, especially, a high-frequency component of a phase distribution is extremely degraded. The phase distribution is measured by moving the focus position back and forth. Then, low-frequency components are subtracted from the measured phase distribution. FIG. 6 illustrates cross-sectional profiles of the phase distributions which include only high-frequency components for comparison. In FIG. 6, an abscissa axis represents cross-sectional coordinates, while an ordinate axis represents amplitudes. Because the amplitude is maximized at a position where the test surface is focused, the position of the image-pickup unit 8 is adjusted to the focus position at which the amplitude is maximized. In a case illustrated in FIG. 6, the amplitude is maximized at the focus position "focus3". Although FIG. 6 illustrates an example in which the focus position is obtained from one cross-sectional profile, a focus position can be obtained from a plurality of cross-sectional profiles. An average value of the obtained focus positions can be used.

(3) Method Utilizing Diffraction at Edge Portion

This method can be applied to a case where the measurement region includes an end portion (edge portion) of the test surface. Even when the measurement region does not include an edge portion, this method can be applied thereto by mounting a member for causing Fresnel diffraction in the measurement region or at the edge portion of the measurement region.

Figure 7:
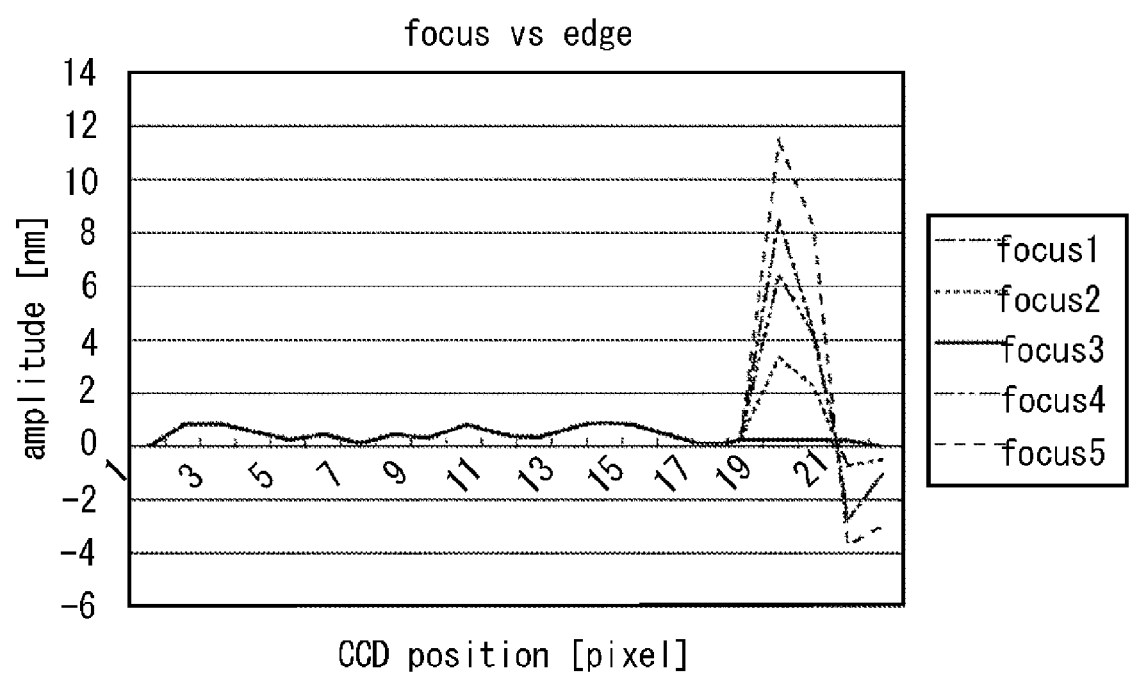
FIG. 7 illustrates relationships between each focus position and influence of diffraction caused at an edge part of a test surface.

When a focal point of the test surface 4a is deviated from the light receiving surface of the image-pickup unit 8, influence of Fresnel diffraction increases at the edge portion of the test surface. The phase distributions of interference fringes are acquired by moving the focus position back and forth. FIG. 7 illustrates comparison of cross-sectional profiles of the phase distributions at an edge portion of the test surface 4a. In FIG. 7, an abscissa axis represents cross-sectional coordinates, while an ordinate axis represents amplitudes. Because the influence of the diffraction is minimized at a position where the test surface is focused, the position of the image-pickup unit 8 is adjusted to the focus position at which the influence of the diffraction is minimized. In a case illustrated in FIG. 7, the influence of the diffraction is minimized at the focus position "focus3". Although FIG. 7 illustrates an example in which the focus position is obtained from one cross-sectional profile, a focus position can be obtained from a plurality of cross-sectional profiles. An average value of the obtained focus positions can be used.

(4) Method Utilizing Stored Information

This method utilizes a relationship between the position of the test object 4 and that of the image-pickup unit 8, which is preliminarily stored, to obtain the focus position that corresponds to the cavity length corresponding to the position of the test object 4 in each sub-aperture. The cavity length corresponding to each sub-aperture can be obtained from a designed value of the test surface 4a. However, e.g., when the test surface 4a is in production so that an actual value of the test surface 4a largely differs from the designed value thereof, it is useful to provide a length measuring device on the rear surface of the test surface 4a. Thus, an accurate cavity length can be obtained by the length measuring device.

Next, in the third step S203, the phase distributions of the interference fringes used to separately calculate the shapes of the test surface and the reference surface are measured at the focus positions of the test surface 4a in the first step S201 and in the second step S202. In the fourth step S204, the shape of the reference surface 3a and that of the test surface 4a are separately calculated using the phase distribution measured in the third step S203. Accordingly, in the third step S203, the phase distributions of the interference fringes necessary for such calculation are measured.

A phase shift method is used in the measurement of the phase distributions. According to the phase shift method, a plurality of interference fringes are acquired while the distance between the reference surface 3a and the test surface 4a is changed by an amount several times the wavelength of light from the light source 1. The phase distributions of interference fringes are calculated according to a manner of variation in the plurality of interference fringes. The distance therebetween can be changed by driving the test object 4 in the direction of a z-axis, using the z-axis of the stage 6. Alternatively, the TS lens 3 can be driven in the direction of an optical axis by providing a drive mechanism in the z-axis direction to the TS lens 3 or to the reference surface 3a of the TS lens 3. Alternatively, the phase distributions can be calculated by modulating the wavelength of the light from the light source 1 while the distance therebetween is fixed.

The fourth step S204 is a calculation step in which data associated with the shape of the reference surface 3a corresponding to the focus position is subtracted from the phase distribution acquired in the third step S203 to calculate the shape of the measurement region wp1. An error in the shape of the reference 3a is canceled from the shape of the measurement region calculated in the fourth step S204. Consequently, a more highly accurate shape of the measurement region can be obtained.

Various methods for measuring the phase distributions of interference fringes to calculate the shape of the measurement region can be considered. Desirable methods to be applied to the third step S203 and the fourth step S204 according to some embodiments of the present invention are described below.

(1) First Method

Figure 8:
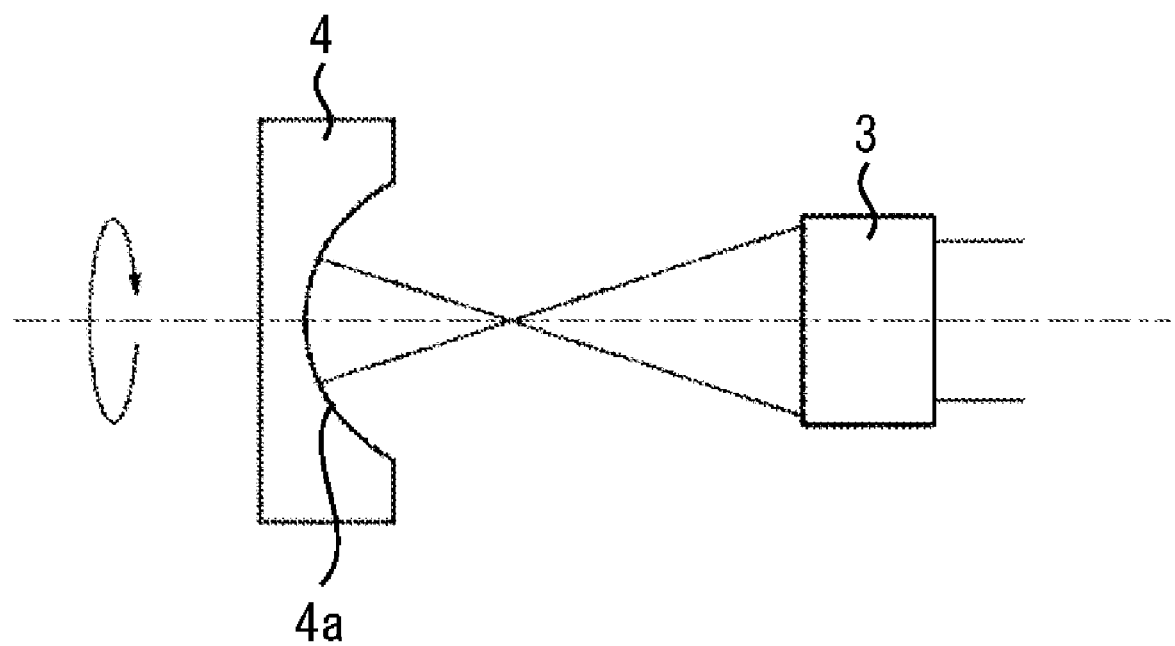
FIG. 8 schematically illustrates a configuration for measuring phase distributions of interference fringes in a third step.
Figure 9:
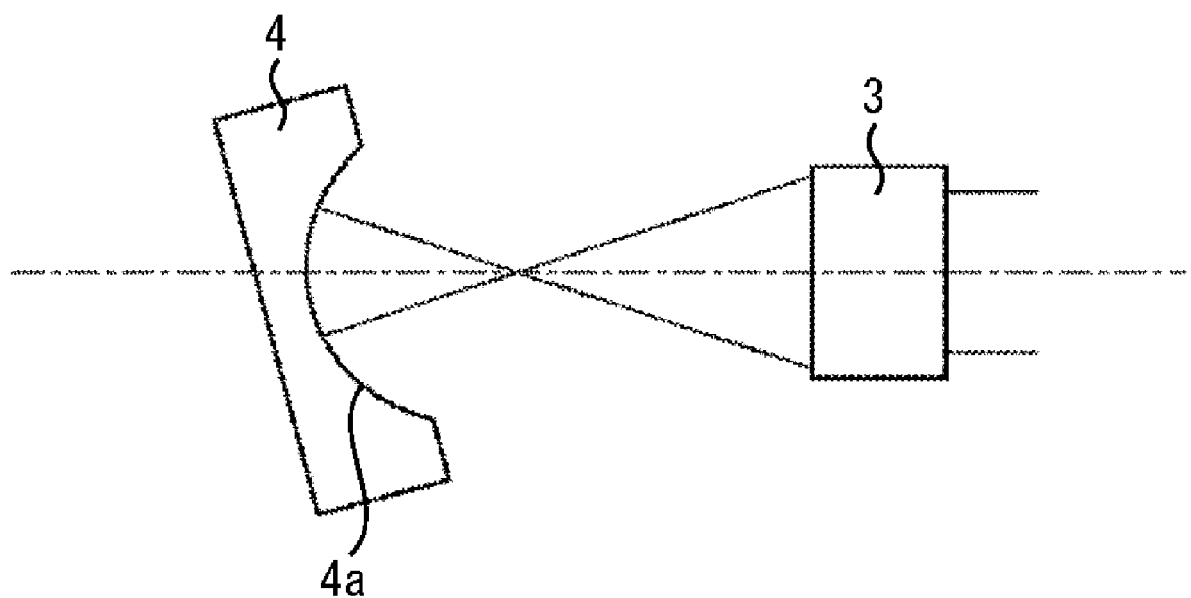
FIG. 9 schematically illustrates another configuration for measuring the phase distributions of interference fringes in the third step.

In the third step S203, a plurality of phase distributions are acquired by rotating the test object 4 around the center of the measurement region, as illustrated in FIG. 8. Then, the phase distribution is measured in a state in which the test object 4 is moved along the test surface 4a by an amount of several percent through several tens percent of the measurement region, as illustrated in FIG. 9. In the fourth step S204, non-rotationally symmetrical components of the test surface 4a are obtained, using the rotated phase distribution acquired in the third step S103, by averaging, or by utilizing an algorithm of a shearing interference method. Further, rotationally symmetrical components of the test surface 4a are obtained by utilizing the algorithm of the shearing interference method, and using the phase distributions obtained by moving the test object 4 back and forth along the test surface 4a. The relationship between the shape of the reference surface 3a, which is calculated together with that of the test surface 4a, and the focus position can be stored in the apparatus.

(2) Second Method

In the third step S203, the phase distributions are measured in a plurality of states in each of which the test object 4 is moved along the test surface 4a by an amount of several percent through several tens percent of the measurement region, as illustrated in FIG. 9. In the fourth step S204, the shape of the test surface 4a is obtained by utilizing the algorithm of the shearing interference method and using data that is obtained in the third step S203 by moving the test object 4 along a plurality of test surfaces 4a. The relationship between the shape of the reference surface 3a, which is calculated together with that of the test surface 4a, and the focus position can be stored in the apparatus.

(3) Third Method

Figure 10:
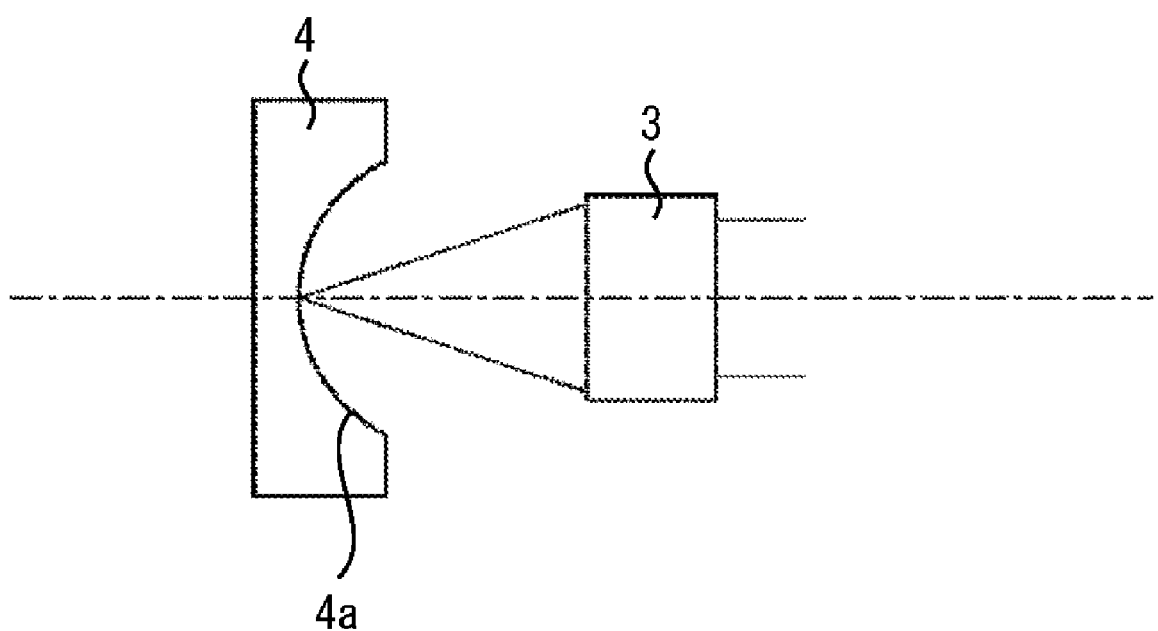
FIG. 10 schematically illustrates another configuration for measuring the phase distributions of interference fringes in the third step.
Figure 11:
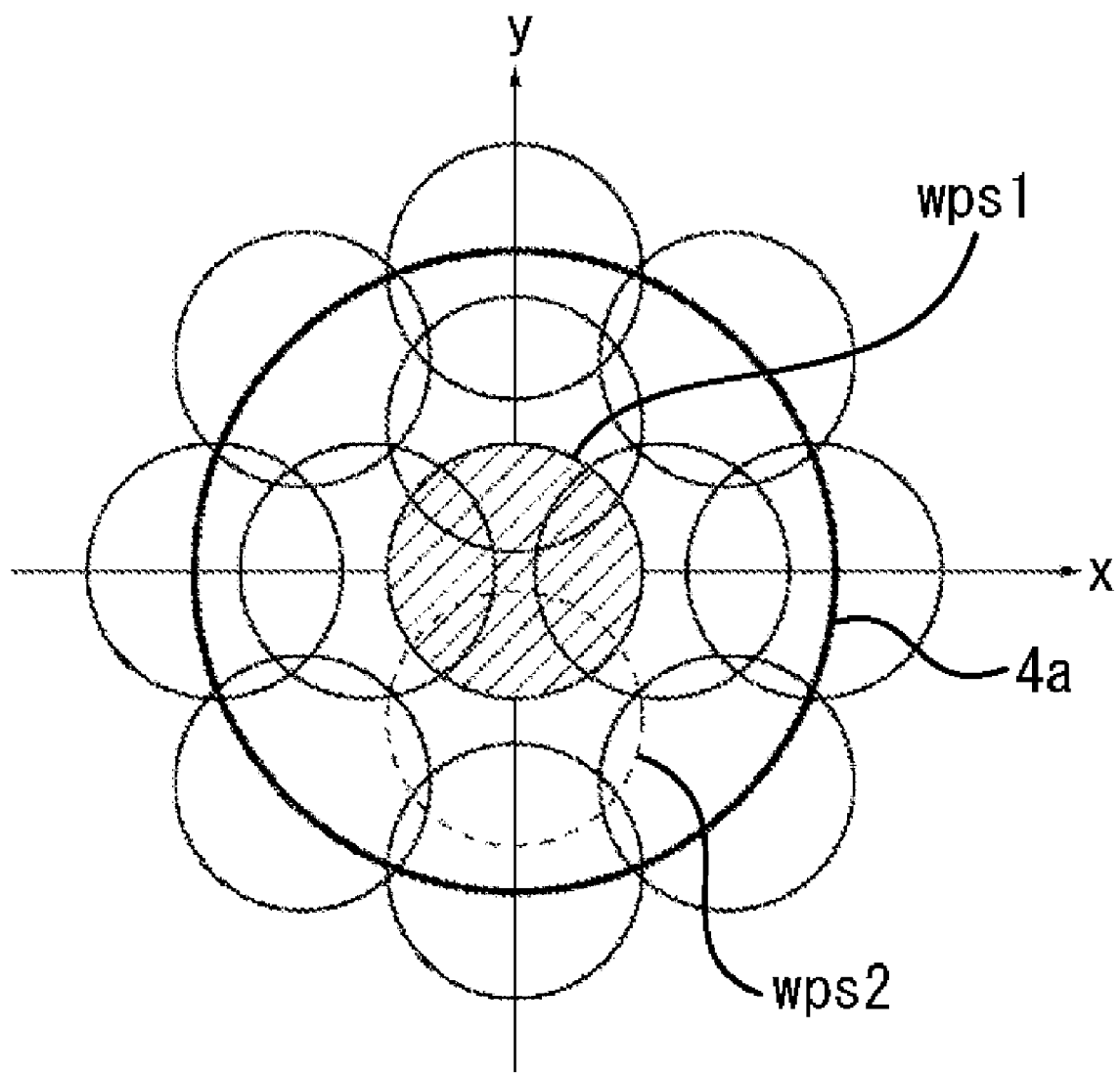
FIG. 11 schematically illustrates a plurality of measurement regions into which a test surface is divided.
Figure 12:
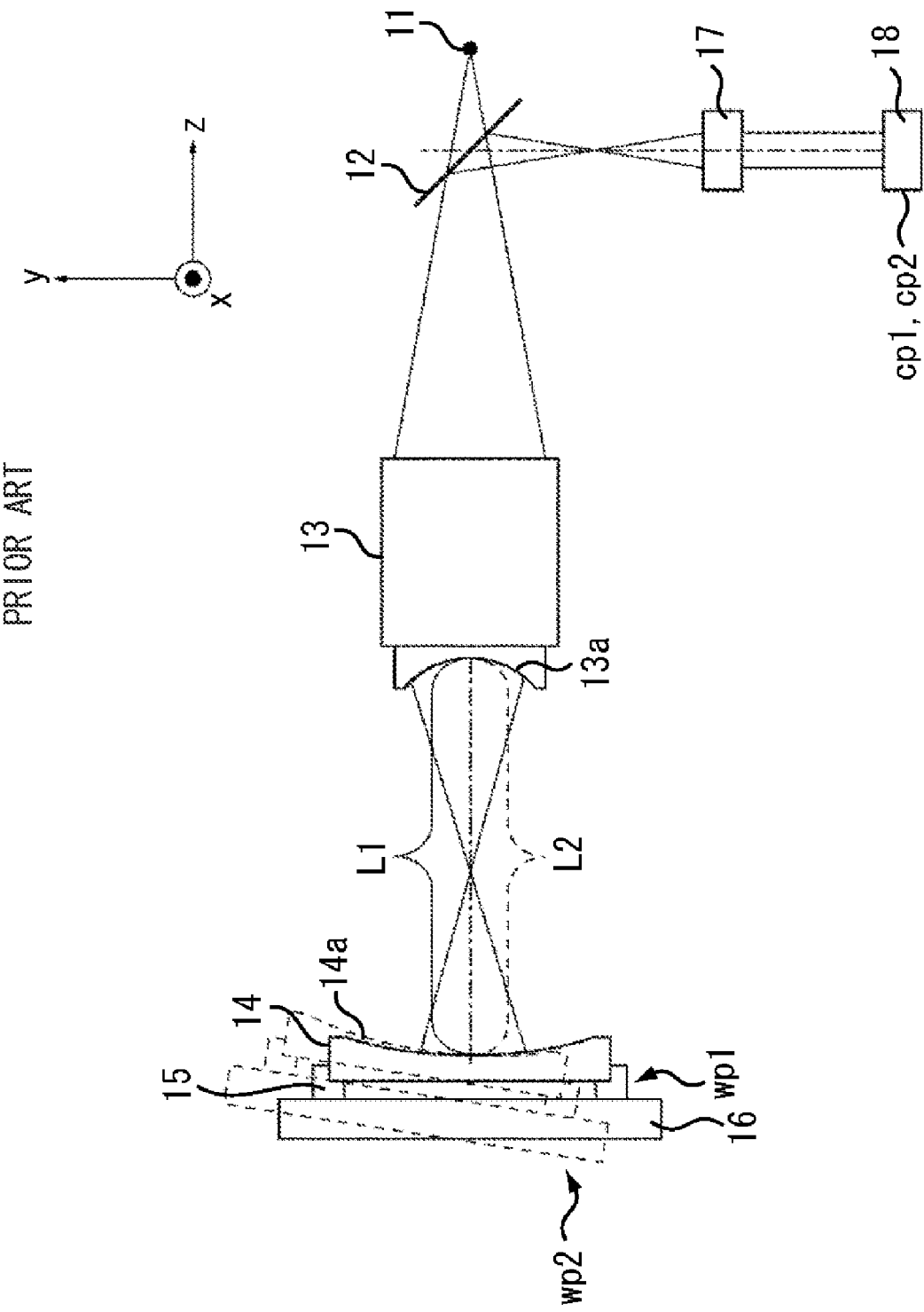
FIG. 12 schematically illustrates a measurement apparatus for performing a stitching method.

In the third step S203, the phase distributions are measured by rotating the test object 4 to angular positions of 0° and 180° located around the center of the sub-aperture, as illustrated in FIG. 8. In addition, the phase distributions are measured in a state what is referred to as a cat's-eye state by bringing the test surface 4a to the position of a light-condensing point of the TS lens 3, as illustrated in FIG. 10. In the fourth step S204, the shape of the test surface 4a is obtained by an algorithm of what is referred to as a 0°-180°-cat's eye method, using the phase distributions at the angular positions of 0° and 180° and a cat's-eye position which are obtained in the third step S203. The relationship between the shape of the reference surface 3a, which is calculated together with that of the test surface 4a, and the focus position can be stored in the apparatus.

(4) Fourth Method

In the third step S203, one phase distribution of the test surface 4a is acquired. The shape of the reference surface 3a corresponding to each of the focus positions is preliminarily stored in the apparatus. The shape of the test surface 4a is obtained by using the shape of the reference surface 3a corresponding to the focus position of the test surface 4a in the second step, and by subtracting data representing the shape of the reference surface from the phase distribution acquired in the third step S203.

The shape of the measurement region wps1 at the time when the test object 4 is placed at the first position wp1 can be calculated by performing processing in the above four steps S201 through S204.

Although exemplary embodiments of the present invention have been described in the foregoing description, the present invention is not limited to the above exemplary embodiments.

For example, according to the exemplary embodiment of the present invention, it has been described the case where the NA of the test surface 4a is larger than that of the reference surface 3a. However, the shape calculation method according to the present invention can be applied even to the case where the NA of the test surface 4a is equal to or less than that of the reference surface 3a.

In the foregoing description of the exemplary embodiment of the present invention, the Fizeau interferometer, in which the light reflected by the reference surface and the light reflected by the measurement surface have substantially the same optical axis, has been described by way of example. Interferometers, which can be used in the shape calculation method according to the present invention, are not limited the Fizeau interferometer. For example, a Twyman-Green interferometer and a Michelson interferometer can be used.

In the exemplary embodiments of the present invention, it has been described by way of example that the measurement is performed by illuminating the aspherical test surface with spherical waves. However, the present invention can be applied to a case that the measurement is performed by illuminating the aspherical test surface with aspherical waves.

Optical elements, such as a lens and a mirror, can be manufactured using the above shape calculation method according to the present invention. More specifically, according to the shape calculation method of the present invention, the shape of the optical element is calculated. Then, the optical element is processed by, e.g., polishing, cutting, and film-formation, based on a difference between the calculated shape and a designed value of the optical element. Consequently, optical elements with less error can be manufactured.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-311231, filed Dec. 5, 2008, which is hereby incorporated by reference herein in its entirety.

What is claimed is:

1. A method for calculating a shape, the method comprising:

dividing an aspherical test surface into a plurality of measurement regions configured to overlap with one another, receiving, at a light receiving unit, interference fringes which occur due to interference light generated by light reflected on a reference surface serving as a reference for calculating a shape of the test surface and light reflected by each of the measurement regions, and calculating surface shapes of the measurement regions; and calculating a shape of the test surface by joining the calculated surface shapes of the measurement regions, wherein the calculation of surface shapes of the measurement regions, includes:

adjusting a position of the test surface based on the reference surface;

adjusting a position of the light receiving unit so that the test surface and the light receiving unit have a conjugate relationship with each other in a state in which the position of the test surface is kept adjusted based on the reference surface;

measuring phase distributions of the interference fringes in a state in which the position of the light receiving unit is adjusted; and calculating the surface shape of each of the measurement regions based on the measured phase distributions of the interference fringes.

2. The method according to claim 1, further comprising:
adjusting a position of the light receiving unit so that a modulation of the interference fringes is maximized.

3. The method according to claim 1, further comprising:
adjusting a position of the light receiving unit so that an amplitude of a high-frequency component of a phase distribution is maximized.

4. The method according to claim 1, further comprising:
adjusting, when the measurement region includes an edge part of the test surface, a position of the light receiving unit so that influence of diffraction caused at the edge part is minimized.

5. The method according to claim 1, further comprising:
adjusting a position of the light receiving unit based on the adjusted position of the test surface and on a preliminarily obtained relationship between a position of the test surface and that of the light receiving unit.

6. The method according to claim 1, wherein the test surface is rotated around the center of each of the measurement regions so as to measure a plurality of phase distributions in the step of measuring the phase distributions of the interference fringes.

7. The method according to claim 1, wherein the test surface is rotated to angular positions of 0° and 180° located around the center of each of the measurement regions so as to measure the phase distributions, and the phase distributions are measured in a state in which the test surface is brought to a light-condensing point of test light, in the step of measuring the phase distributions of the interference fringes.

8. The method according to claim 1, wherein a position of a center of curvature of each of the measurement regions of the test surface coincides with a position of a center of curvature of a spherical wave from the reference surface in the step of adjusting the position of the test surface.

9. A method for manufacturing an optical element, the method comprising:

calculating a shape of an optical element according to a shape calculation method; and processing the optical element based on the calculated shape of the optical element, wherein the shape calculation process includes:

dividing an aspherical test surface into a plurality of measurement regions configured to overlap with one another, receiving, at a light receiving unit, interference fringes which occur due to interference light generated by light reflected on a reference surface serving as a reference for calculating a shape of the test surface and light reflected by each of the measurement regions, and calculating surface shapes of the measurement regions; and calculating a shape of the test surface by joining the calculated surface shapes of the measurement regions, wherein the calculation of surface shapes of the measurement regions, includes:

adjusting a position of the test surface based on the reference surface;

adjusting a position of the light receiving unit so that the test surface and the light receiving unit have a conjugate relationship with each other in a state in which the position of the test surface is kept adjusted based on the reference surface;

measuring phase distributions of the interference fringes in a state in which the position of the light receiving unit is adjusted; and calculating the surface shape of each of the measurement regions based on the measured phase distributions of the interference fringes.

* * * * *